(12) United States Patent
Marino et al.

(10) Patent No.: US 6,452,601 B1
(45) Date of Patent: Sep. 17, 2002

(54) PIXEL COMPONENT PACKING, UNPACKING, AND MODIFICATION

(75) Inventors: Richard Anthony Marino, Leander; Mark Ernest Van Nostrand, Cedar Park, both of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/315,544

(22) Filed: May 20, 1999

(51) Int. Cl.[7] .............................................. G06F 13/00
(52) U.S. Cl. ....................... 345/538; 345/559; 345/600; 345/603
(58) Field of Search ................................ 345/501, 520, 345/537, 538, 546, 559, 545, 561, 562, 600, 603–605; 710/124–129; 711/202

(56) References Cited

U.S. PATENT DOCUMENTS

| | | | | |
|---|---|---|---|---|
| 5,243,447 A | * | 9/1993 | Bodenkamp et al. | 345/546 |
| 5,678,009 A | * | 10/1997 | Bains et al. | 710/125 |
| 5,680,161 A | * | 10/1997 | Lehman et al. | 345/531 |
| 5,745,119 A | * | 4/1998 | Parchem et al. | 345/603 |
| 6,195,734 B1 | * | 2/2001 | Porterfield et al. | 711/202 |

* cited by examiner

Primary Examiner—Kee M. Tung
(74) Attorney, Agent, or Firm—Joseph P. Lally; Mark E. McBurney (57) ABSTRACT

A computer system and an associated graphics adapter that includes one or more processors connected to a host bus. A system memory is accessible from the host bus via a memory controller and an I/O bridge is coupled between the host bus and an I/O bus. The computer system further includes a frame buffer suitable for storing a representation of a graphic image and the graphics adapter connected to the I/O bus. The graphics adapter includes means for receiving host pixel data that is formatted, according to a host format defining the ordering and width of a set host components, as a set of host component values. The adapter also has means for transforming the host pixel data into frame buffer pixel data where the frame buffer pixel data is formatted, according to a frame buffer format defining the ordering and width of a set of frame buffer components, as a set of frame buffer component values. In the preferred embodiment, the value of each host pixel data component is replicated in a corresponding component of the frame buffer pixel data by repeating the bits comprising the value in the corresponding frame buffer component until the frame buffer component is full. In the preferred embodiment, the transforming means includes a programmable set of host format definition registers that define the host format. These registers preferably include a start bit register and a width register for each component of the data. The component data widths are permitted to vary from one another in the preferred embodiment such that a first component of the host pixel data could have one width an a second component could have another (different) width. The adapter preferably further includes means for scaling and biasing the frame buffer pixel data and means for transforming (packing) frame buffer pixel data into host pixel data.

23 Claims, 4 Drawing Sheets

PIXEL COMPONENT PACKING, UNPACKING, AND MODIFICATION

BACKGROUND

1. Field of the Present Invention

The present invention generally relates to the field of computer graphics and more particularly to a system and method adapted for converting pixel data between various pixel data formats.

2. History of Related Art

Graphics display subsystems are almost universally encountered in microprocessor based computer systems to facilitate a variety of graphics tasks and applications. Graphics processors, graphics adapters, and a variety of similarly designed computer products provide specialized hardware to speed the execution of graphics instructions and the rendering of graphic images. These processors and adapters typically include, for example, circuitry optimized for displaying images. The rendering process includes the process of specifying attributes for each pixel in a particular display device.

Unfortunately, graphics applications software and graphics hardware do not always utilize the same pixel data format. When differences in pixel data format are encountered, it is the responsibility of the graphics adapter to reconcile the formatting differences between pixel data presented to the adapter and pixel data stored in a frame buffer by the adapter. Conventionally, rather crude methods of achieving this reconciliation have been used in which every pixel data format supported by the adapter is declared or enumerated and hardware or software facilities for reconciling each supported format are implemented in the adapter. Moreover, prior methods of transforming data values from one format to another have been traditionally accomplished with simplistic approaches that unnecessarily distort the image upon transformation to the frame buffer format. Accordingly, it would be highly desirable to implement a graphics adapter and method that could flexibly accommodate or support a wide variety of pixel data format and that could produce a format transformation that minimizes distortion of the original graphic image data.

SUMMARY OF THE INVENTION

The problems identified above are in large part by a graphics adapter and method for supporting a wide variety of host pixel data formats without significantly increasing the cost or complexity of the design. In addition the invention contemplates a data replication technique in conjunction with the format transformation process that minimizes transformation distortion. These benefits are achieved through the use of programmable facilities that determine the format of host pixel data and, thereafter, transform the host pixel data to a format suitable for a frame buffer.

Broadly speaking, the invention contemplates, a computer system and an associated graphics adapter. The computer system includes one or more processors connected to a host bus. A system memory is accessible from the host bus via a memory controller and an I/O bridge is coupled between the host bus and an I/O bus. The computer system further includes a frame buffer suitable for storing a representation of a graphic image and the graphics adapter connected to the I/O bus. The graphics adapter includes means for receiving host pixel data that is formatted, according to a host format defining the ordering and width of a set of host components, as a set of host component values. The adapter also has means for transforming the host pixel data into frame buffer pixel data where the frame buffer pixel data is formatted, according to a frame buffer format defining the ordering and width of a set of frame buffer components, as a set of frame buffer component values. In the preferred embodiment, the value of each host pixel data component is replicated in a corresponding component of the frame buffer pixel data by repeating the bits comprising the value in the corresponding frame buffer component until the frame buffer component is full. In the preferred embodiment, the transforming means includes a programmable set of format definition registers that define the relationship between the host format and the frame buffer format. These registers preferably include a start bit register and a width register for each component of the data. The component data widths are permitted to vary from one another in the preferred embodiment such that a first component of the host pixel data could have one width while a second component has another (different) width. The adapter preferably further includes means for scaling and biasing the frame buffer pixel data and means for transforming (packing) frame buffer pixel data into host pixel data.

The invention further contemplates a method of processing pixels in which host pixel data is received and transformed into frame buffer pixel data. The host pixel data is formatted, according to a host format defining the ordering and width of the host components, as a set of host component values. The frame buffer pixel data is formatted, according to a frame buffer format defining the ordering and width of the frame buffer components, as a set of frame buffer component values. The frame buffer pixel data is then forwarded to a frame buffer and ultimately displayed on a display device. The transforming preferably includes replicating the value of each host component in a corresponding component of the frame buffer pixel data by repeating the bits that comprise the value in the corresponding frame buffer component until the frame buffer component is full. In the preferred embodiment, the transforming includes programming a set of host format definition registers prior to receiving the host pixel data. The method further includes scaling and biasing the frame buffer pixel data and transforming frame buffer pixel data to host pixel data and forwarding the host pixel data back to the host.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF A PREFERRED EMBODIMENT OF THE PRESENT INVENTION

Figure 1:
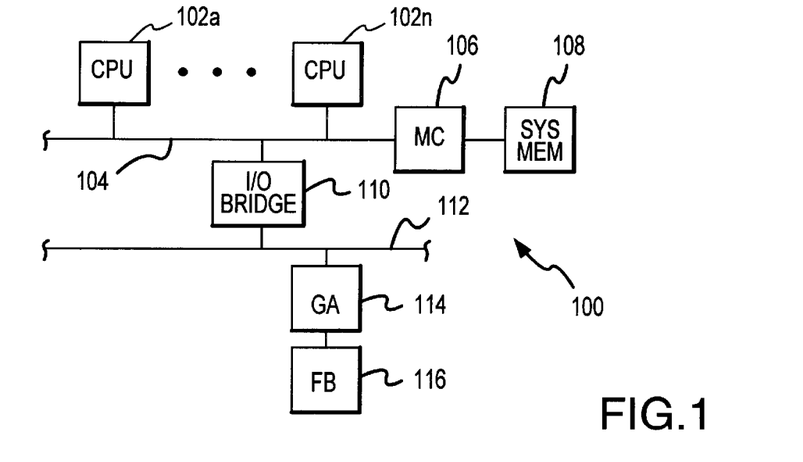
FIG. 1 is a simplified block diagram of a computer system according to the present

Turning now to the drawings, FIG. 1 depicts a computer system 100 according to the present invention. Computer system 100 includes one or more processors (CPUs) 102a . . . 102n (collectively referred to as set of processors 102) connected via a host bus 104 A system memory 108 is accessible from host bus 104 through an intervening memory controller 106. System memory 108 is preferably comprised of an array of DRAM modules as is well known in the field of microprocessor based computer design. An I/O bridge 110 provides couples host bus 104 to an I/O bus 112. I/O bridge 112 is suitably adapted for connecting a wide variety of I/O peripheral devices such as hard disk controllers, network adapters, audio cards, and graphics adapters such as graphic adapter 114. I/O bus 112 is preferably compliant with any of a number of industry standard I/O bus architectures designed for high speed communications with host bus 104. Bus architectures suitable for I/O bus 112 include PCI, AGP, ISA, EISA, and MCA bus architectures. In the presently preferred embodiment I/O bus is compliant with the PCI Local Bus Specification Rev. 2.2 available from the PCI Special Interest Group, 575 NE Kathryn St. #17, Hillsboro, Oreg. 97124 and incorporated by reference herein. Graphics adapter 114 controls frame buffer 116. Frame buffer 116 provides a dedicated memory for storing graphic images. A digital representation of a graphic image is stored in frame buffer 116 and output on a display device such as a video monitor (not shown) or a hard copy device. In one embodiment, frame buffer 116 may comprise a dual ported portion of system memory 108. Graphics adapter 114 is responsible for assembling, disassembling, and sometimes modifying pixel data as they are transferred from a system to a display device, system to system, or display device to system.

Figure 2:
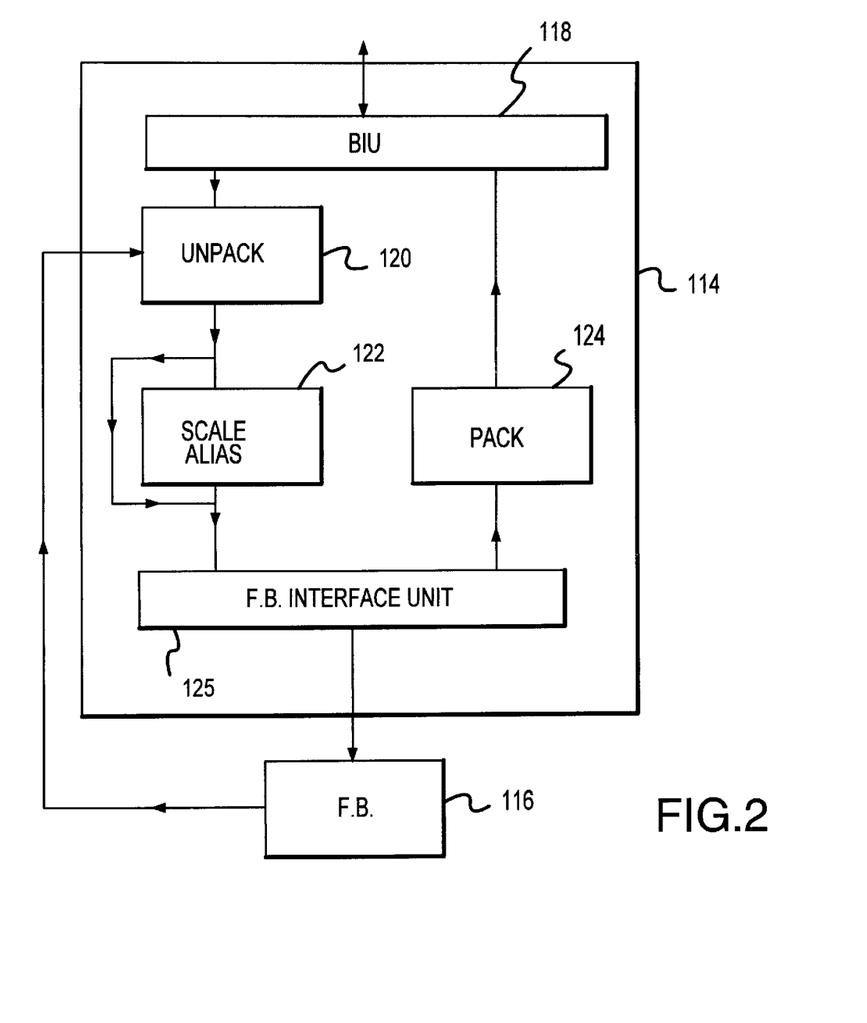
FIG. 2 is a simplified diagram of a graphics adapter including pixel unpacking/packing facilities.

Turning now to FIG. 2, a conceptual representation of selected features of graphic adapter 114 according to the present are depicted. Graphics adapter 114 as contemplated herein provides a mechanism that permits the components of pixel data generated by an application program to be presented to graphics adapter 114 in essentially any format. Graphics adapter 114 transforms the incoming data format, referred to for purposes of this disclosure as the host pixel data format, in a format suitable for storing in the frame buffer 116 (the frame buffer pixel format). Utilizing the flexible transformation contemplated by graphics adapter 114 as disclosed herein eliminates the need to enumerate each specific host pixel data format that the graphics adapter can support. In addition, the transformation of host pixel data by graphics is accomplished with a data replication technique that results in a more accurate representation of the original data.

Graphics adapter 114 includes a host bus interface unit (BIU) 118 that is adapted for receiving host pixel data from host bus 104 (via I/O bridge 110 and I/O bus 112) and for sending pixel data back to host 114. Host pixel data received via BIU 118 is then "unpacked" in an unpacking stage 120 of a transformation process according to the invention. In the unpacking stage 120, the format of the host pixel data (the host format) is determined and the host pixel data is reformatted into a format compatible for storage in frame buffer 116. It is highly desirable to store data in frame buffer 116 using a single data format to simplify the design and efficiency of a video adapter or controller (not depicted) whose primary function is to reproduce the graphic image represented in frame buffer 116 on a suitable display device. The video controller may comprise a portion of graphics adapter 114. In an alternative arrangement, the video controller may be a discrete component, module, or adapter card. Regardless of the specific implementation, the task of the video controller is considerably simplified if all frame buffer data is stored in a single format. In one presently preferred embodiment, the frame buffer pixel format includes 4 components, namely, red, green, blue, and alpha, each of which is eight bits wide. Unfortunately, many existing graphics application programs do not provide pixel data to the system's graphics adapter in this preferred 32 bit format. For example, many graphics applications use a 4×2 pixel data format in which each of the four components (red, green, blue, and alpha) are 2 bits wide. In such a case, the function of unpacking stage 120 is to transform the eight bit host data into 32 bit frame buffer data suitable for storage in frame buffer 116 without fundamentally altering the information conveyed by the incoming data (i.e., without substantially changing the graphic image). The specifics of unpacking stage 120 are discussed in greater detail below.

After host pixel data has been transformed into the frame buffer data format in unpacking stage 120, the transformed pixel data enters scaling stage 122. In scaling stage 122, pixel data is manipulated to create desired graphic effects. In the presently preferred embodiment, scaling stage 122 performs a linear transformation on the pixel data through the use of a y=Ax+B type function, where x represents host pixel data, y represents frame buffer pixel data, A is a scaling constant, and B is an aliasing constant. In one embodiment, each component of the pixel data is scaled and aliased according to its own corresponding function. Thus, green component data is manipulated with a "green" function where $y_G = A_G X_G + B_G$, red component data is manipulated with a red function where $Y_R = A_R X_R + B_R$, and so forth. In one embodiment, the A and B constants for each component are programmed using a PXC_SCALE command that includes 4 words of data indicating the $A_A$, $B_A$, $A_R$, $B_R$, $A_G$, $B_G$, $A_B$, and $B_B$ values. In the preferred embodiment, scaling stage 122 may be bypassed entirely by issuing an appropriate command to graphics adapter 114. After pixel data has been appropriately scaled in scaling block 122, it is suitable for storing in frame buffer 116 via frame buffer interface unit 125. The preferred embodiment of the invention supports not only system-to-screen pixel transfers (i.e., transfers from host bus 104 to frame buffer 116), but also screen-to-system transfers (i.e., from frame buffer 116 to host bus 104) as well as screen-to-screen transfers (i.e., transfers from frame buffer 116 to frame buffer 116). A screen-to-screen transfer might be utilized, for example, in an application such as dragging a window across a display screen in which it is unnecessary to use CPU's 102. As indicated in FIG. 2, unpacking stage 120 is configured to receive input pixel data from host bus 104 (via BIU 118) and from frame buffer 116. The output from unpacking stage can be routed via frame buffer interface unit 125 to either frame buffer 116 or to host bus 104. To insure that data sent back to host bus 104 is received in the appropriate pixel data format, graphics adapter 114 includes a packing stage 124 that performs a transform function on the pixel data that is essentially the inverse of the transformation of unpacking stage 120.

Figure 3:
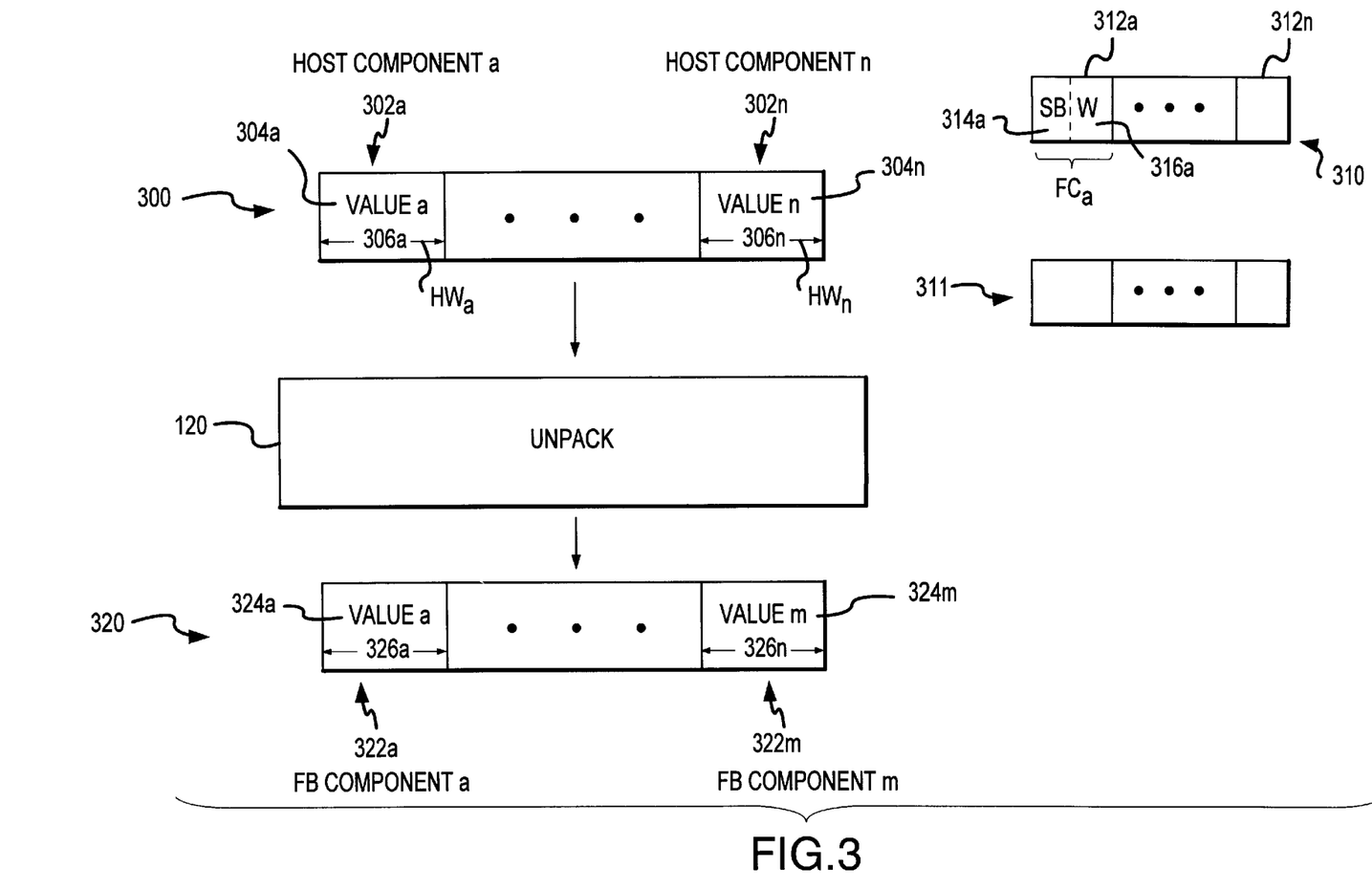
FIG. 3 is a conceptualized representation of the pixel unpacking function of the present invention.

Turning now to FIG. 3, a conceptualized depiction of the unpacking performed by unpacking stage 120 is presented.

Host pixel data 300 is received from host bus 104 and I/O bus 112 via BIU 118 and forwarded to unpacking stage 120. Host pixel data 300 includes a set of host values 304a . . . 304n (collectively referred to as host values 304) that are formatted according to a host format. The host format defines the ordering and respective widths of a set of host components 302a . . . 302n. The width of each host component 302 is identified in FIG. 3 by reference numeral 306a . . . 306n. Unpacking stage 120 transforms host pixel data 300 into frame buffer pixel data 320, where the format of frame buffer pixel data 320 is suitable for storing in frame buffer 116. Similar to the formatting of host pixel data 300, frame buffer pixel data 320 is formatted as a set of frame buffer components 322. Each component 322 has a bit width indicated in FIG. 3 by reference numeral 326. Each frame buffer component 322 contains a frame buffer value 324. In the preferred embodiment, unpacking stage 120 includes means for determining the format structure of the host pixel data 300 such as the format definition register 310 shown in FIG. 3. Programming the format definition register is preferably accomplished with a dedicated graphics adapter instruction identified in this disclosure as the PXC_WCOLOFF command. In the preferred embodiment, the dedicated instruction is an extension of an existing, standardized graphics adapter instruction set such as OpenGL. Format definition register 310 is preferably subdivided into a set of component definition operands 312a . . . 312n. Each component definition operand 312 includes a start bit segment 314 and a width segment 316. In the preferred embodiment, format definition register 310 includes a component definition segment 312 for each component 322 of the frame buffer format. Each component definition segment 312 includes a start bit field 314 and width field 316. Start bit field 314 identifies the starting bit in host pixel data 300 of the host component 302 that corresponds to a frame buffer component 322. For example, the first component segment 312a of format definition register 310 informs graphics adapter 114 where within host pixel data 300 it will find data associated with the first frame buffer component 322a. With means for defining the defining the host format in relation to the frame buffer format, unpacking stage 120 is adapted to efficiently convert any definable host format into a single frame buffer without requiring an enumeration of supported formats.

Figure 4:
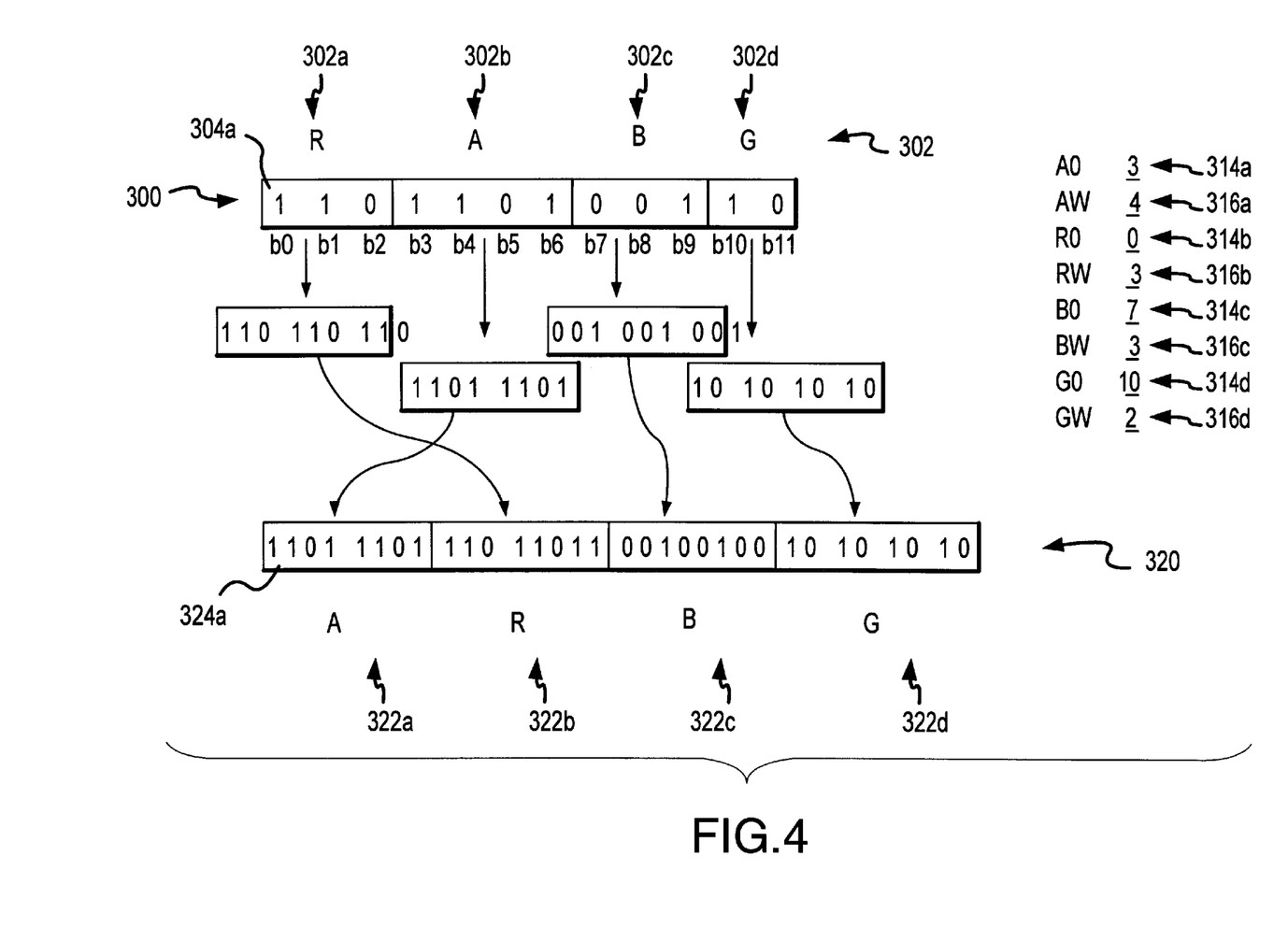
FIG. 4 illustrates an example of the pixel unpacking and data replication function according to the present invention.

Turning now to FIG. 4, a specific example of the unpacking function performed by unpacking stage 120 is presented to illustrate the replication feature of the invention that provides an accurate reproduction of host pixel data 300 to frame buffer 116. Host pixel data 300 in the depicted example is delivered to graphics adapter 114 and unpacking stage 114 in a 12 bit format that includes 4 components 302. First component 302a (the red component of host pixel data 300) is a 3-bit field starting at bit 0 of host pixel data 300. Referring to FIG. 3, it is seen that second component 302b (alpha) of host pixel data 300 is a 4-bit field starting at bit 3, third component 302c (blue) is a 3-bit field starting at bit 7, and fourth component 302d (green) is a 2-bit field starting at bit 10. In the depicted embodiment, it is assumed that the frame buffer format component ordering is alpha-red-blue-green (ARBG) and that each component comprises an 8-bit field. In this example then, first component segment 312a of format definition register 310 would be programmed with a 3 in start bit field 314a and a 4 in width field 316a to indicate the position and width of the alpha component of host pixel data 300. Similarly with respect to the remaining components such that the start bit and width fields of the remaining component segments 312b through 312d (not shown explicitly in the drawings) would be programmed as follows: 314b:0; 316b:3; 314c:7; 316c:3; 314d:10; 316d:2 to indicate the information necessary for unpacking stage 120 to reformat host pixel data 300.

In the preferred embodiment of the invention, the unpacking includes a data replication feature that improves on the practice of padding a string of O's onto host data when the frame buffer format has a wider field than the host data. The replication of data according to the preferred embodiment of unpacking stage 120 duplicates the bit string in each component 302 of host pixel data 300 until the number of bits is equal to or greater than the width of the corresponding component 322 of frame buffer pixel data 320. The uppermost N bits are then stored in the frame buffer pixel data component, where N is the width of the frame buffer component 322. Returning to the example presented in FIG. 4 and with reference to first component field 302a of host pixel data 300. The component 302a is 3 bits wide and contains a binary value of 304a 110. This binary value typically represents a measure of the intensity with which the associated component is to be displayed. It will be appreciated that simply padding the data with trailing O's until the data fits the host format tends to distort the graphic image by under-emphasizing the intensity in the larger field. More specifically, a binary value of 110 in a three bit field indicates that the intensity of the corresponding component should be approximately 85.7% of the maximum intensity available (assuming the scale is linear). Expanding the three bit field to an eight bit field by padding O's results in an eight bit value of C0xh, which indicates an intensity of approximately 75.3% of the maximum available intensity. The present invention improves on this distortion by the process of replicating the data bit stream to pad the lower bits of the expanded field. Thus, the 110 bit field would be replicated by duplicating the field twice to produce a 9-bit field (110 110 110) and then using the upper 8 bits as the data for the appropriate component of the frame buffer pixel data. In the example under consideration, the frame buffer pixel data component corresponding to the 110 host pixel data component would be stored as 11011011 or DBxh, which indicates an intensity of 85.9% of the maximum intensity. Thus, a significantly more accurate reproduction of the original image is created with the replication process described herein and incorporated into the unpacking function 120 according to the preferred embodiment of the invention.

Packing stage 124 in the preferred embodiment includes facilities to perform a function that is essentially an inverse of unpacking function described above. With respect to FIG. 4, for example, the packing function would receive frame buffer pixel data in the frame buffer format and convert it to the host format. A second format definition register 311 (shown in FIG. 3) would include sufficient information to enable packing stage 120 to produce host pixel data in the host format. For host pixel data component fields that are smaller than their corresponding frame buffer pixel data components, the host component values would be taken from the upper M bits of the of the corresponding frame buffer component value, where M is the width of the host component. In the preferred embodiment, the formatting information is stored in second format definition register 311 with a second dedicated graphics command identified for purposes of this disclosure as an PXC_RCOLOFF command.

Figure 5:
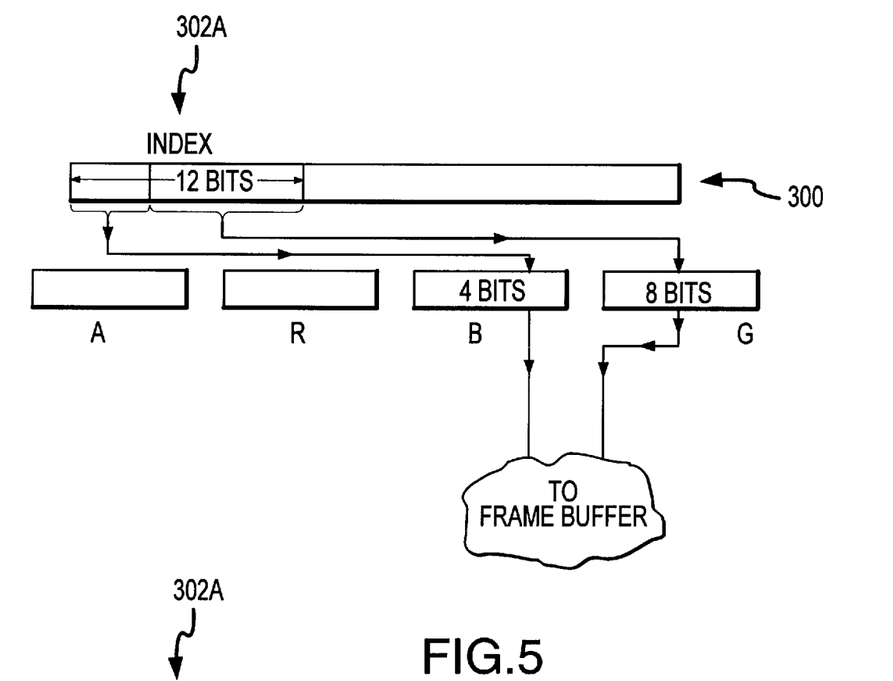
FIG. 5 illustrates an example of a system-to-screen transfer of pixel data including an index field.
Figure 6:
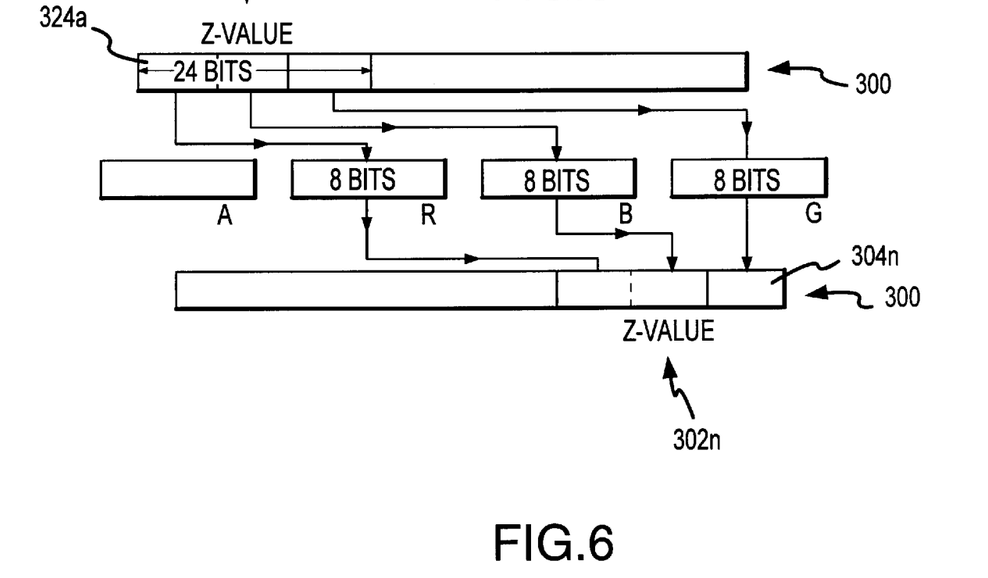
FIG. 6 illustrates an example of a screen-to-system transfer of pixel data including a z-value field.

Turning now to FIGS. 5 and 6, examples of uses of unpacking stage 120 in connection with pixel component fields of greater than 8 bits are presented. FIG. 5 represents a system-to-screen transfer of host pixel data 300 that includes a 12 bit index field 302a. Index fields are widely used in a variety of application programs to represent pixel attributes such as color. An index field is typically used in conjunction with a look up table (not depicted). The use of index fields and look up tables is known in the graphics field. Through the use of unpacking stage 120 as presented herein, however, the index field 302a may comprise any portion of host pixel data 300. By appropriately programming of format definition register 310 and appropriate configuration of the look up table, the invention removes restrictions on the placement of index field 302a. In the depicted example, a lookup table extracts the 12-bit index field information from the lower 12 bits of the output of unpacking stage 120 that was stored in frame buffer 106. Through appropriate programming of format definition register 110, the 12 bit index field 302a of host pixel data 300 is mapped into these lower 12 bits. FIG. 6 represents a screen-to-system transfer of pixel data that includes a z-value component. Frame buffer pixel data 320 includes a 24 bit value 324a in z-value component field 322a that is mapped into the z-value component field 302n of host pixel data 300 through appropriate programming of format definition registers 310 and 311. In the preferred embodiment, this z-value mapping is achieved in an operation distinct from the PXC_RCOLOFF command such that the facilities and registers of unpacking and packing stages 120 and 124 respectively can be used for different purposes depending upon the operation that is currently executing.

It will be apparent to those skilled in the art having the benefit of this disclosure that the present invention contemplates a graphics adapter designed to support a wide range of pixel data formats and to perform appropriate format transformation with a minimum of distortion. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A computer system comprising:
   a system memory accessible from the host bus via a memory controller;
   an I/O bridge coupled between the host bus and the I/O bus;
   a frame buffer suitable for storing a representation of a graphic image; and
   a graphics adapter on the I/O bus, wherein the graphics adapter comprises
      register means for programmably specifying a host pixel data format that defines the ordering and width of a set of host components;
      means for receiving host pixel data comprising a set of host component values formatted according to the host pixel data format;
      means for transforming the host pixel data into frame buffer pixel data formatted, according to a frame buffer format defining the ordering and width of a set of frame buffer components, as a set of frame buffer component values; and
   means for forwarding the frame buffer pixel data to the frame buffer.

2. The computer system of claim 1, wherein the width of a host component is less than the width of the corresponding frame buffer component and wherein the transformation means derive a value for the frame buffer component from the host component value by appending replicates of the bit string comprising the host component value to the host component value until the bit-width of the resulting bit string equals or exceeds the width of the frame buffer component.

3. The computer system of claim 1, wherein the programmable specification means comprises a host format definition register having a set of fields corresponding to each host component wherein values in the host format definition register fields define the host format.

4. The computer system of claim 3, wherein the host format definition register includes a start bit field and a width field for each component of the frame buffer format.

5. The computer system of claim 1, further comprising facilities to accommodate screen-to-system pixel transfers and screen-to-screen pixel transfers utilizing the transforming means.

6. The computer system of claim 1, wherein the programmable specification means permits the width of a first host component to differ from the width of a second host component.

7. The computer system of claim 1, wherein the components of the frame buffer format each have equal width.

8. The computer system of claim 1, further comprising means for scaling and biasing the frame buffer pixel data.

9. The computer system of claim 1, further comprising means for transforming frame buffer pixel data to host pixel data and means for forwarding the host pixel data back to the host.

10. A graphics adapter comprising:
    register means for programmably specifying a host pixel data format that defines the ordering and width of a set of host components;
    means for receiving host pixel data comprising a set of host component values formatted according to the host pixel data format;
    means for transforming the host pixel data into frame buffer pixel data formatted, according to a frame buffer format defining the ordering and width of a set of frame buffer components, as a set of frame buffer component values, wherein the transforming means support any host format in which the set of host components is equal to or a subset of the set of frame buffer components and the width of each host component is less than or equal to the width of the corresponding frame buffer component; and
    means for forwarding the frame buffer pixel data to a frame buffer.

11. The graphics adapter of claim 10, wherein the width of a host component is less than the width of the corresponding frame buffer component and wherein the transformation means derive a value for the frame buffer component from the host component value by appending replicates of the bit string comprising the host component value to the host component value until the bit-width of the resulting bit string equals or exceeds the width of the frame buffer component.

12. The graphics adapter of claim 10, wherein the programmable specification means comprises a host format definition register having a set of fields corresponding to each host component wherein values in the host format definition register fields define the host format.

13. The graphics adapter of claim 12, wherein the host format definition register includes a start bit field and a width field for each component of the frame buffer format.

14. The graphics adapter of claim 10, wherein the host format permits any component width less than or equal to 8.

15. The graphics adapter of claim 10, wherein the host format permits the width of a first host component to differ from the width of a second host component.

16. The graphics adapter of claim 10, wherein the components of the frame buffer format each have equal width.

17. The graphics adapter of claim 10, further comprising means for scaling and biasing the frame buffer pixel data.

18. The graphics adapter of claim 10, further comprising means for transforming frame buffer pixel data to host pixel data and means for forwarding the host pixel data back to the host.

19. A method of processing pixels, comprising:

providing register means for programmably specifying a host pixel data format from that defines the ordering and width of a set of host components;

receiving host pixel data comprising a set of host component values formatted according to the host pixel data format;

transforming the host pixel data to frame buffer pixel data formatted, according to a frame buffer format defining the ordering and width of the frame buffer components, as a set of frame buffer component values wherein the transforming accommodates any host format in which the set of host components is equal to or a subset of the set of frame buffer components and the width of each host component is less than or equal to the width of a corresponding frame buffer component; and forwarding the frame buffer pixel data to a frame buffer.

20. The method of claim 19, wherein the step of transforming includes deriving a value for the frame buffer component from the host component value by appending replicates of the bit string comprising the host component value until the bit-width of the resulting bit string equals or exceeds the width of the frame buffer component.

21. The method of claim 19, wherein the step of transforming includes programming a set of host format definition registers prior to receiving the host pixel data, wherein values of the host format definition registers define the host format.

22. The method of claim 19, further comprising scaling and biasing the frame buffer pixel data.

23. The method of claim 19, further comprising transforming frame buffer pixel data to host pixel data and forwarding the host pixel data back to the host.

* * * * *

UNITED STATES PATENT AND TRADEMARK OFFICE
CERTIFICATE OF CORRECTION

PATENT NO. : 6,452,601 B1
DATED : September 17, 2002
INVENTOR(S) : Richard Anthony Marino and Mark Ernest Van Nostrand It is certified that error appears in the above-identified patent and that said Letters Patent is hereby corrected as shown below:

<u>Column 7,</u>
Lines 41 through line 62, claim 1 should read as follows:
1. A computer system comprising:

at least one processor connected to a host bus;

a system memory accessible from the host bus via a memory controller;

an I/O bridge coupled between the host bus and the I/O bus;

a frame buffer suitable for storing a representation of a graphic image; and a graphics adapter on the I/O bus, wherein the graphics adapter comprises >register means for programmably specifying a host pixel data format that defines the ordering and width of a set of host components;

>means for receiving host pixel data comprising a set of host component values formatted according to the host pixel data format;

>means for transfroming the host pixel data into frame buffer pixel data formatted, according to a frame buffer format defining the ordering and width of a set of frame buffer components, as a set of frame buffer component values; and >means for forwarding the frame buffer pixel data to the frame buffer.

Signed and Sealed this

Third Day of December, 2002

JAMES E. ROGAN
*Director of the United States Patent and Trademark Office*